United States Patent [19]
Pedersen et al.

[11] Patent Number: 5,285,867
[45] Date of Patent: Feb. 15, 1994

[54] STEERING ARRANGEMENT

[75] Inventors: Poul H. H. Pedersen, Nordborg; Thorkild Christensen; Johannes V. Baatrup, both of Sonderborg; Svend E. Thomsen, Nordborg, all of Denmark

[73] Assignee: Danfoss A/S, Nordborg, Denmark

[21] Appl. No.: 724,160

[22] Filed: Jul. 1, 1991

[30] Foreign Application Priority Data

Aug. 14, 1990 [DE] Fed. Rep. of Germany .... 4025697.9

[51] Int. Cl.$^5$ ............................................... B62D 1/22
[52] U.S. Cl. .................................. 180/321; 180/132; 180/142; 192/44; 475/329; 475/4
[58] Field of Search ............. 180/321, 323, 324, 131, 180/132, 78, 142, 143; 192/7, 44; 475/329, 3, 4; 74/625, 665 A, 665 B

[56] References Cited

U.S. PATENT DOCUMENTS

| | | | |
|---|---|---|---|
| 3,059,716 | 10/1962 | Iserman et al. | 180/321 |
| 4,219,093 | 8/1980 | Lang | 180/131 |
| 4,261,224 | 4/1981 | Sulzer | 475/4 |
| 4,318,451 | 3/1982 | Liggett | 180/321 |
| 4,515,221 | 5/1985 | van der Lely | 180/131 |
| 4,852,707 | 8/1989 | Ito et al. | 192/7 |
| 4,940,105 | 7/1990 | Matsunaga et al. | 180/133 |
| 4,956,590 | 9/1990 | Phillips | 180/142 |
| 4,994,001 | 2/1991 | Wilkinson et al. | 475/4 |

FOREIGN PATENT DOCUMENTS 0163830 7/1987 Japan ....................... 180/321
1369081 10/1974 United Kingdom .

*Primary Examiner*—Margaret A. Focarino
*Assistant Examiner*—Paul Dickson
*Attorney, Agent, or Firm*—Wayne B. Easton

[57] ABSTRACT

The handwheel of a vehicle is connected to a handwheel shaft which in turn is connected through a load torque isolating device (overrunning clutch) that acts in either of the two directions of rotation and is connected to a steering shaft that controls a hydraulic arrangement. The hydraulic arrangement controls a steering motor that in turn controls the direction of turning of the vehicle. A second motor is drivingly connected to the overrunning clutch to rotate the steering shaft when the second motor is operated but when the steering is controlled by the handwheel, movement of the second motor is prevented. The second motor is operable from a location remote from the vehicle. The overrunning clutch includes a hub connected to the steering shaft and is movable by the handwheel shaft, the hub being wedgable against the clutch housing for being driven by the second motor by two jamming rollers that each acts in one direction of rotation and can be released by rotating the handwheel shaft. In one embodiment, the load torque isolating device may be arranged between a planetary gear and the steering handwheel shaft arrangement. Sensors and a control circuit may be arranged to achieved a direct correlation between the position of the steering handwheel and the steering angle.

19 Claims, 8 Drawing Sheets

STEERING ARRANGEMENT

FIELD OF THE INVENTION

The invention relates to a steering arrangement with a steering control unit that is operable by a steering shaft, the steering shaft being arranged to be driven by a steering handwheel shaft connected to a steering handwheel and by a motor.

DESCRIPTION OF THE PRIOR ART

In a known arrangement of this kind (U.S. Pat. No. 4,318,451), which serves for steering a heavy goods vehicle with a crane mounted on its platform, the motor can be remotely-controlled from the cab of the crane, and serves to steer the front wheels without the steering handwheel having to be operated. The steering handwheel shaft and the output shaft of the motor are switched to the steering shaft by way of a T-gear mechanism. When the driver operates the steering handwheel, he must drive not only the steering shaft but also the motor.

In another known arrangement, (GB-PS 13 69 081) an hydraulic motor is provided which is able to drive the steering handwheel shaft directly by way of a pair of pinions. The pinion on the motor output shaft can be disengaged from the pinion on the steering handwheel shaft. In this state the vehicle can be steered only by way of the steering handwheel. If the driver forgets to engage the motor pinion with the steering handwheel pinion before he leaves the cab, the vehicle cannot be remotely-controlled.

SUMMARY OF THE INVENTION

It is an aim of the present invention to describe a steering arrangement which takes more of the burden of work off the driver.

This problem is solved in a steering arrangement of the kind mentioned in the introduction in that a load torque isolating device acting in two directions of rotation is arranged on the steering handwheel shaft. This load torque isolating device enables auxiliary assemblies, for example the motor, to be made available on the side of the load torque isolating device remote from the steering handwheel shaft, and these assemblies can be permanently engaged with the steering shaft without the driver having to move this auxiliary arrangement as he operates the steering handwheel.

In a preferred form of construction, the load torque isolating device is in the form of an overrunning clutch operating in two directions of rotation, by means of which the motor acts on the steering shaft, the steering handwheel shaft being moved as well when the motor is operated, but movement of the motor by the steering handwheel shaft being prevented. When the vehicle is being remotely-controlled, which is effected by a control means of the motor, the steering handwheel also turns. This is harmless however, since in this case there will not generally be in the cab anyone who could be troubled by a moving steering handwheel. Conversely, when the driver wants to steer the vehicle using the steering handwheel, he merely has to exert the force necessary to operate the steering shaft. The load torque isolating device in the form of an overrunning clutch prevents the motor having to move as well. In determining the specification for the motor, only its drive power needs to be taken into account, and not the force to be applied to move the stationary motor. When the driver remains in the cab, he is able to assume control using the steering at any time. For example, he can hold the steering wheel firmly to prevent operation of the steering. That may be advisable in the case of vehicles with articulation control that have been made self-aligning with the aid of a control device, when in certain situations the self-aligning facility nevertheless has to be restrained.

In a preferred form of construction, the load torque isolating device has connected to the steering shaft a hub, which is movable by the steering handwheel shaft, the hub being wedged against a clutch housing drivable from the motor by two jamming rollers, each acting in one direction of rotation and which can be released on operation of the steering handwheel. The hub can, for example, be positively engaged with the steering shaft by means of a spline. The steering handwheel shaft can, for example, have driver pins which are mounted with slight clearance in the hub. To release the jamming rollers, operating pins may be provided, for example, which release the jamming rollers from their wedging position. If a force is now exerted on the steering handwheel shaft, then depending on the direction of rotation one or the other of the operating pins presses the associated jamming roller out of engagement with the housing. The hub is able to rotate freely towards the housing. Because the housing does not need to be rotated with the hub, the motor does not need to be moved. The force to be exerted by the operator is restricted to the force required to move the steering shaft. The jamming roller that remains engaged then acts as a free-wheeling device running with no load. If, on the other hand, the housing is rotated by the motor, the jamming rollers wedge between the housing and the hub, one jamming roller being provided for each direction of rotation. To facilitate the wedging operation, a spring may be provided between the two jamming rollers.

On operation of the motor, not only is the steering shaft rotated with it, but also the steering handwheel shaft.

In a preferred form of construction, the motor is in the form of an electric motor, and in particular a stepping motor. Electric motors are easy to control remotely, because the amount of electrical energy that has to be supplied to the motor can readily be controlled externally. In addition, electric motors enable the angle of rotation to be adjusted with great precision. For their operation, apart from the current that is available in any case in a vehicle, they do not require any further auxiliary sources.

It is an advantage for a control device controlling the motor to be provided, for an angle of rotation sensor to be arranged on the steering handwheel shaft, and for a steering signal-generating means to be provided, the control device operating the motor in order to compensate for the difference between the output signal of the angle of rotation sensor and the output signal of the steering signal-generating means. The steering signal generating means can, for example, be formed by a control stick or "joy-stick". The driver is then able to determine the desired steering lock by the extent of displacement of the control stick, just as he would normally do by a particular rotation of the steering handwheel. To be able to obtain agreement between the displacement of the control stick and the rotation of the steering handwheel, the angle of rotation of the steering handwheel is ascertained. If there is no agreement between the displacement of the control stick and the rotation of the steering handwheel, the motor is operated, that is to say, it turns the steering handwheel and operates the steering control unit. In addition to the said control stick, other devices may be provided as steering signal-generating means, for example the receiver of a remote control device which works with electromagnetic waves, light or sound.

In another preferred form of construction, provision is made for a steering angle sensor to be arranged on the steering motor, the control device operating the motor in order to compensate for the difference between the output signal of the steering angle sensor and the output signal of the steering signal-generating means. By this means, it is possible to compensate for errors appearing as the result of possibly occurring leakages in the steering control unit and in the steering motor.

Preferably, the steering control unit is in the form of an hydraulic steering device, which operates an hydraulic steering motor. The steering control unit is thus power-assisted, so that the burden on the driver is substantially eased. On operation of the steering shaft, he needs to apply only a comparatively slight force.

A worm gear is advantageously arranged between the motor and the overrunning clutch. The motor is thus able to be operated at a higher speed of rotation, which is considerably geared down by the worm gear, that is to say, a shaft or a worm with associated gear wheel. In addition, the worm gear operates in a largely self-limiting manner, so that reliable unlocking, i.e., releasing, of the jamming rollers is possible.

In a preferred form of construction, the steering wheel shaft is connected to the steering shaft by means of a planetary gear, the load torque isolating device being arranged between the steering handwheel shaft and the planetary gear and the steering handwheel shaft, the steering shaft and the motor each being associated with a different one of the planetary gear elements sun wheel, planetary wheel holder and gear wheel. In this form of construction, a correlation can be produced between the wheel load and the load at the steering handwheel. The load torque isolating device or overrunning clutch enables the operating force that is applied by the driver at the steering handwheel to have a further force superimposed on it which is applied to the steering shaft from the motor by way of the planetary gear. Moreover, the planetary gear, in conjunction with the load torque isolating device, allows the steering shaft to be driven without the steering handwheel shaft being driven simultaneously by the motor. That allows vehicles that are not inherently self-aligning, for example articulation-controlled vehicles, to be self-aligning. Using the planetary gear it is moreover possible to gear the movement of the steering handwheel shaft to the movement of the steering shaft, so that with a suitably selected gear ratio, the steering can be matched in an optimum manner to the needs of the driver.

It is preferable herein for the steering handwheel shaft to be associated with the planetary gear holder, for the steering shaft to be associated with the sun wheel and the motor to be associated with the gear wheel. The terms for the planetary gear are to be understood according to their function. The planetary gear is not restricted to a construction as a planar planetary gear. The association already mentioned enables not only a favorable gearing to be obtained but also an advantageous overall size. Because the steering shaft is associated with the sun wheel, that is to say, the middle point of the planetary gear, the planetary gear can be arranged virtually around the steering shaft.

The planetary gear holder is advantageously arranged immediately at the power take-off side of the load torque isolating device. In this manner the movement of the steering handwheel shaft and the movement generated by the motor can be superimposed.

It is then an advantage for the axes of the planetary wheels to be secured in the hub. This allows the overall size to be small.

Advantageously, in series with the planetary gear there is arranged a second planetary gear which drives the first planetary gear. With a second planetary gear, the choice of the particular gear ratios becomes quite considerably more free.

It is then preferable for the motor to act on the gear wheel of the first planetary gear.

In a further preferred form of construction, the gear wheel of the second planetary gear is not rotatable, the steering handwheel shaft is connected to the sun wheel of the second planetary gear, the planetary wheel holder of the first planetary gear is connected to the planetary wheel holder of the second planetary gear and the steering shaft is connected to the sun wheel of the first planetary gear. It is thus possible, despite the use of a planetary gear, to achieve a 1:1 gearing between rotation of the steering handwheel shaft and rotation of the steering shaft. Despite this, the advantages of using a planetary gear can be exploited, in particular the advantage that it is possible to superimpose the movement of the steering handwheel shaft on a movement generated from the motor. In this manner, different steering characteristics can be achieved.

It is especially preferred for each of the first and the second planetary gears to have the same gear ratios. Two identical planetary gears are used in practice.

Advantageously, a steering angle sensor is arranged on the steering motor, the steering angle sensor and the angle of rotation sensor being connected to the control circuit which compares the output signals of the two sensors and on predetermined differences operates the motor as the positioning device. The angle of rotation sensor measures the movement, that it to say, the degree of turning of the steering handwheel shaft compared with a neutral position. The steering angle sensor measures the steering angle, that is to say, the swivelling of steered wheels or the articulation of the vehicle in the case of vehicles with articulation control. A desired value is predetermined by the steering handwheel. This desired value is established with the assistance of the angle of rotation sensor. The actual value is the steering angle which is established by the steering angle sensor. If the two values do not match, then the motor is operated. The motor in its turn by way of the planetary gear operates the steering shaft, which operates the steering control unit which leads to an alteration in the steering angle. The load torque isolating device ensures that the steering handwheel shaft does not rotate, and the desired value is thus not altered. In this manner, a direct correlation between the position of the steering handwheel and the steering angle is achieved. Conversely, the driver can be assisted in a predetermined manner in that, on operation of the steering handwheel, the motor is simultaneously operated, the difference occurring on operation of the steering handwheel between the angle of rotation and the steering angle being used as the operating signal for the motor. Depending on the construction of the control circuit, the driver has to apply less force when the motor engages very quickly to assist him or greater force when the motor acts very late or with less force on the steering shaft.

In a preferred form of construction, a driving speed sensor that is connected to the control circuit is provided, the control circuit changing the relationship between the angle of rotation and steering angle on the basis of information from the driving speed sensor. The steering behavior can thus be adapted to the driving speed.

It is then preferable for the ratio of the angle of rotation to the steering angle to decrease with increasing speed. At low speed, for example when maneuvering or parking the vehicle, it may be desirable to obtain a large lock of the wheels, or a pronounced articulation of the vehicle in the case of a vehicle with articulation control, with a relatively small movement of the steering handwheel. The same steering characteristic, however, would lead to dangerous situations at higher speeds. The control circuit therefore alters the steering characteristic, so that at relatively high speeds a much greater rotation of the steering handwheel is required in order to effect a similar displacement of the steered wheels or a similar articulation of the vehicle.

In another preferred construction, a remote sensor connected to the control circuit is provided. The remote sensor enables the vehicle to be steered, for example, by means of a guidance line. This guidance line can be, for example, a groove in the ground, an optical marking, a cutting edge in the case of a crop being harvested, an underground conductor loop which is sensed by the remote sensor. The control device is then able to operate the motor so that it rotates the steering shaft in order to change the direction of the vehicle. The steering handwheel remains in this case in the rest position through the use of the planetary gear and the load torque isolating device, so that the driver can remain in the cab without being disturbed or endangered by the moving steering handwheel. The remote sensor can also be used without planetary gears. In that case, there is a co-rotation of the steering handwheel. In any case, a driver is able to intervene quickly and continue to drive the vehicle manually if dangerous situations arise when the vehicle is being steered automatically.

The motor can advantageously be controlled by a remote control arrangement. This is particularly advantageous when the vehicle is to be steered not only from the cab, but also for example from the cabin of a crane or other working facility arranged on the vehicle. The remote control arrangement may also, however, be arranged in the cab. It is possible, for example, for it to be in the form of a control stick or "joy-stick". By operating the control stick, the vehicle can also be steered without the driver having to perform strenuous movements, which in the long term would tire him. Finally, remote control can also be effected from outside the vehicle, for example by radio, infra-red light or ultrasound. Remote control by way of a cable is also possible, of course.

BRIEF DESCRIPTION OF THE DRAWINGS

The invention is described hereinafter with reference to preferred embodiments, in conjunction with the drawings, in which.

DETAILED DESCRIPTION OF THE INVENTION

Figure 1:
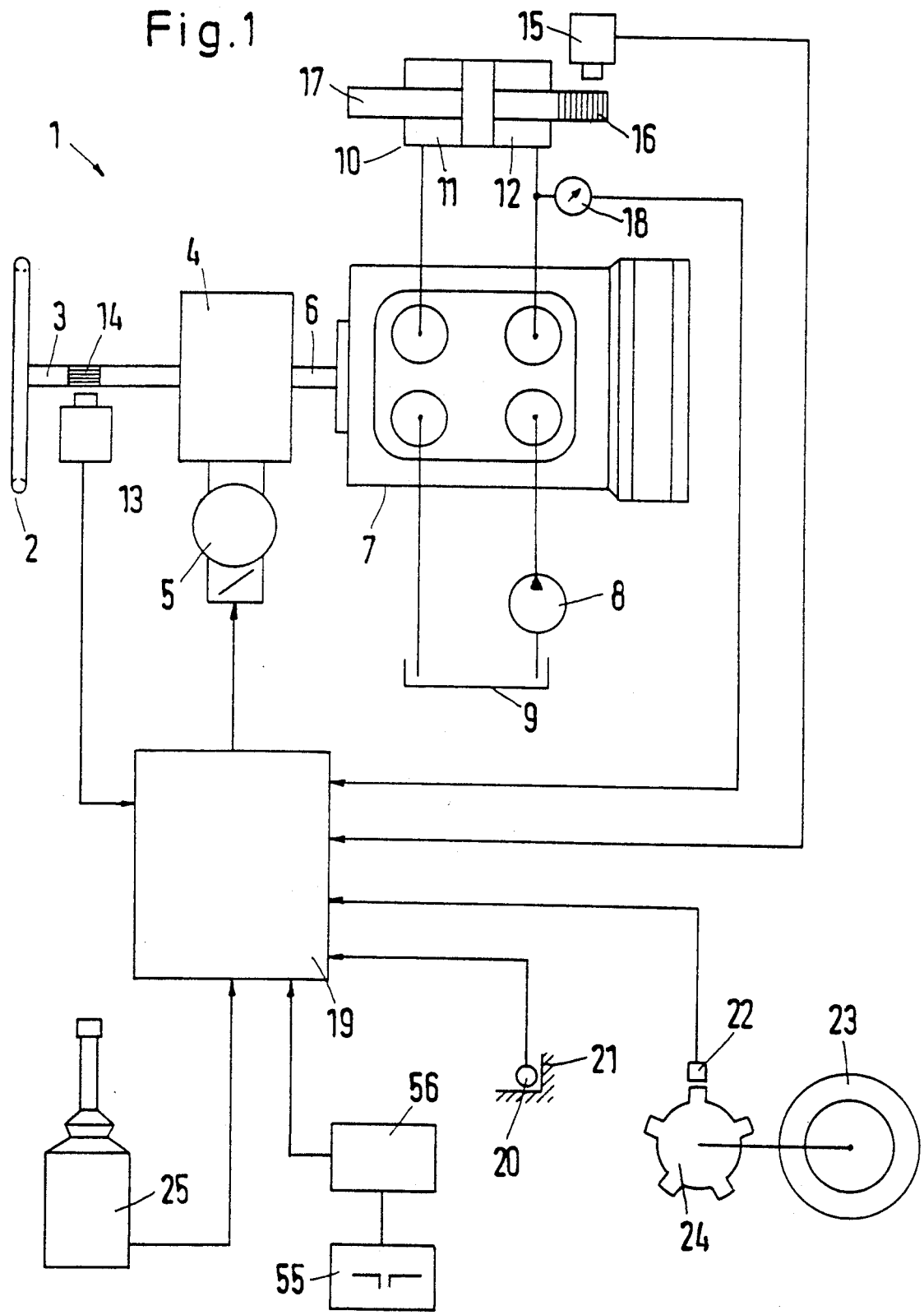
FIG. 1 shows a schematic outline of the steering arrangement.

The apparatus comprises a steering arrangement with a steering control unit that is operable by a steering shaft 6, the steering shaft being arranged to be driven by a steering handwheel shaft 3 connected to a steering handwheel 2 and by a motor 5. The apparatus includes a load torque isolating device 4 (104 in FIG. 7) acting in two directions of rotation and is arranged on the steering handwheel shaft 3.

The load torque isolating device 4 is in the form of an overrunning clutch operating in two directions of rotation, by means of which the motor 5 acts on the steering shaft 6, the steering handwheel shaft 3 being moved as well when the motor 5 is operated, but movement of the motor 5 by the steering handwheel shaft 3 is prevented. The load torque isolating device 4 has connected to the steering shaft 3 a hub 26 which is movable by the steering handwheel shaft 3, the hub being wedged against a clutch housing 27 driveable from the motor 5 by two jamming rollers 34 each acting in one direction of rotation and which can be released on operation of the steering handwheel 2. The motor 5 is in the form of an electric motor, especially a stepping motor.

The steering arrangement 1 includes a control device 19 for controlling the motor 5. An angle of rotation sensor 13 is arranged on the steering handwheel shaft 3 and a steering signal-generating means 25 is provided. The control device 19 operates the motor 5 in order to compensate for the difference between the output signal of the angle of rotation sensor 13 and the output signal of the steering signal-generating means 25.

A steering angle sensor 15 is arranged on the steering motor 10. The control device 19 operates the motor 5 in order to compensate for the difference between the output signal of the steering angle sensor 15 and the output signal of the steering signal-generating means 25.

The steering control unit 7 is in the form of an hydraulic control device which operates the hydraulic steering motor 10.

Figure 2:
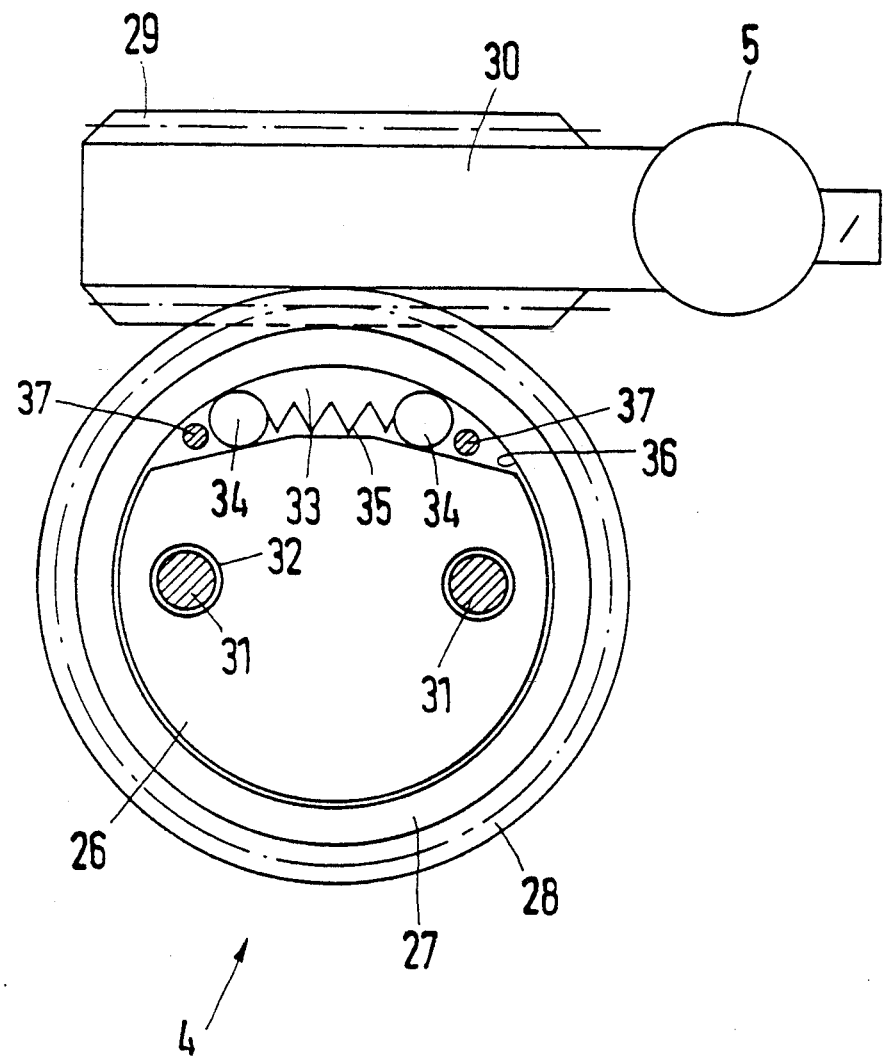
FIG. 2 shows the basic construction of a load torque isolating device.
Figure 5:
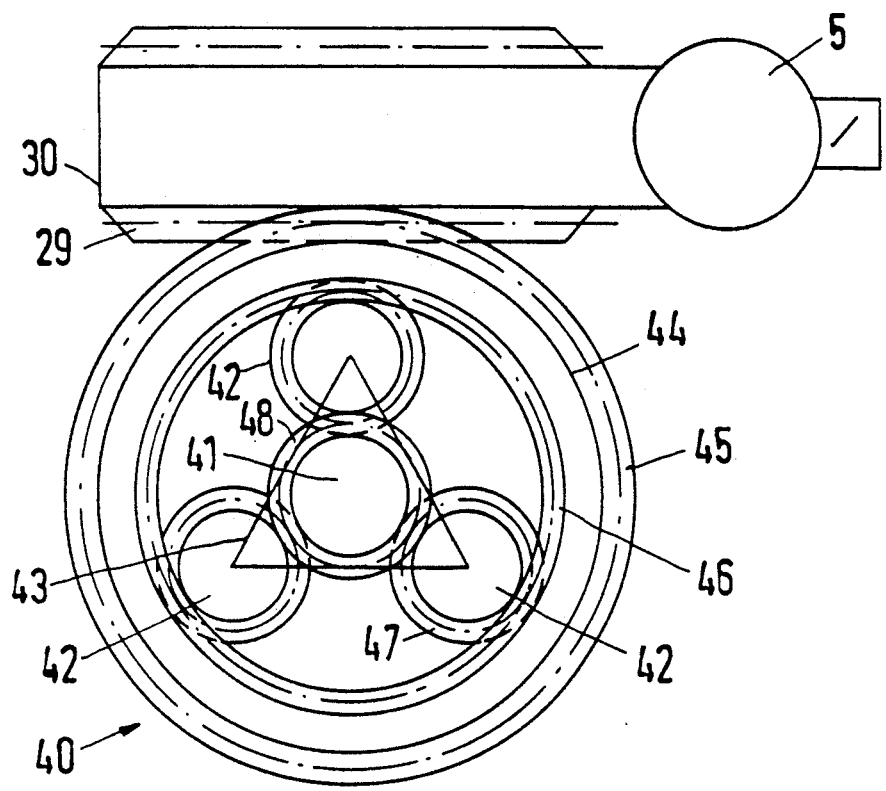
FIG. 5 shows a form of construction with a planetary gear.
Figure 5:
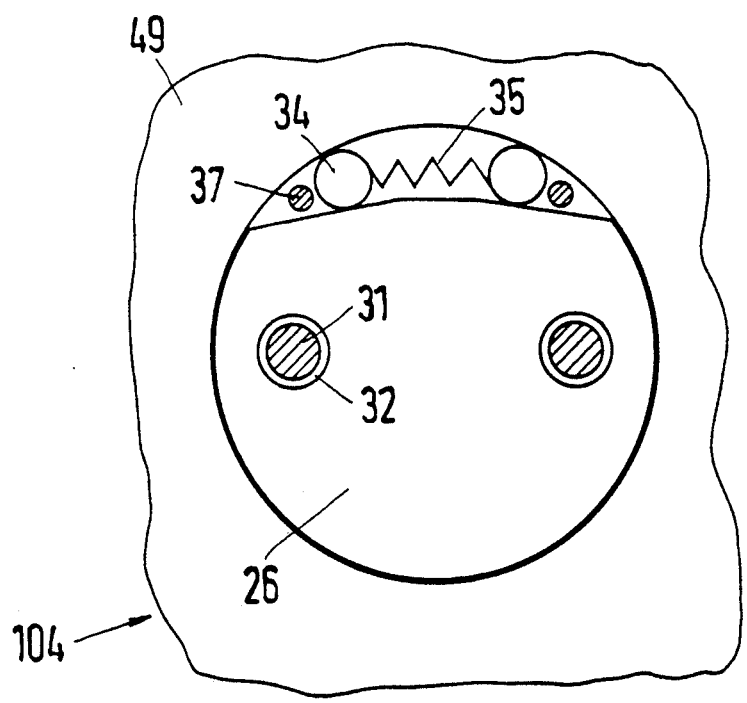

Between the motor 5 and overrunning clutch 4 there is arranged a worm gear 28, 29, 45 (FIGS. 2 and 5).

The steering wheel shaft 3 is connected to the steering shaft 6 by means of a planetary gear 40 with the load torque isolating device 4 being arranged between the steering handwheel shaft 3 and the planetary gear 40. The steering handwheel shaft 3, the steering shaft 6 and the motor 5 are each assigned a different one of the planetary gear elements sun wheel 41, planetary wheel holder 43 and gear wheel 44. Steering handwheel shaft 3 is associated with the planetary wheel holder 43. The steering shaft 6 is associated with the sun wheel 41. Motor 5 is associated with the gear wheel 44. The planetary wheel holder 43 arranged directly at the power take-off side of the load torque isolating device 104. The axes of the planetary wheels 42 are secured in the hub 26.

In series with the planetary gear 40 there is arranged a second planetary gear 51 which drives the first planetary gear 40. Motor 5 acts on the gear wheel 44 of the first planetary gear 40. The steering arrangement 1 is characterized in that the gear wheel 54 of the second planetary gear 51 is not rotatable, the steering handwheel shaft 3 is connected to the sun wheel 53 of the second planetary gear 51, the planetary wheel holder of the first planetary gear 40 is connected to the planetary wheel holder of the second planetary gear 51 and the steering shaft is connected to the sun wheel 41 of the first planetary gear 40. Also, each of the first and the second planetary gears 40, 51 has the same gear ratio.

The steering angle sensor 15 and the angle of rotation sensor 13 are connected to the control circuit 19 which compares the output signals of the two sensors and, on predetermined differences, operates the motor 5 as the positioning device. A driving speed sensor 22 is connected to the control circuit 19. Control circuit 19 changes the relationship of the angle of rotation and the steering angle on the basis of information from the sensor 22. In the steering arrangement the ratio of the angle of rotation to the steering angle decreases with increasing speed. A remote sensor 20 connected to the control circuit 19 is provided and the motor 5 is controllable by a remote control arrangement 25.

Figure 3:
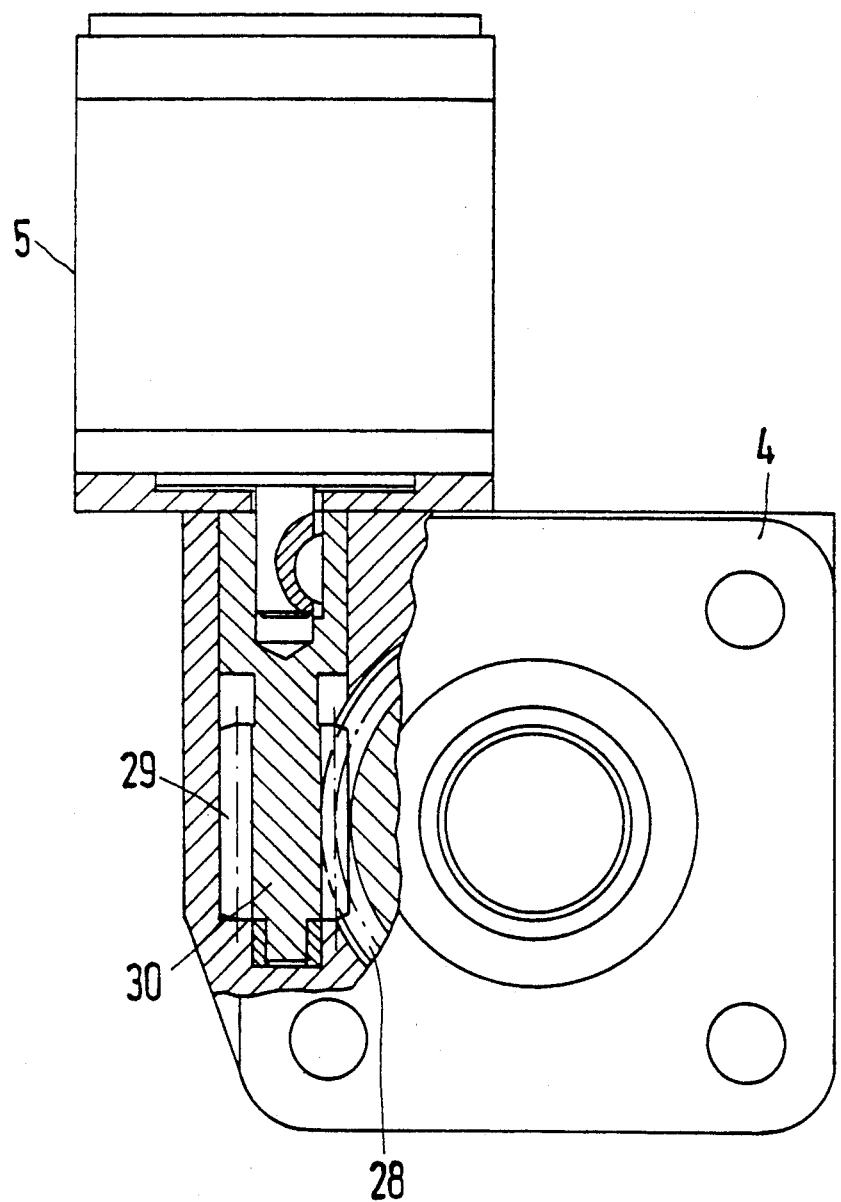
FIG. 3 shows the co-operation between a motor and the load torque isolating device.

FIG. 3 shows the arrangement of the electric motor and overrunning clutch, partly in vertical section.

Figure 4:
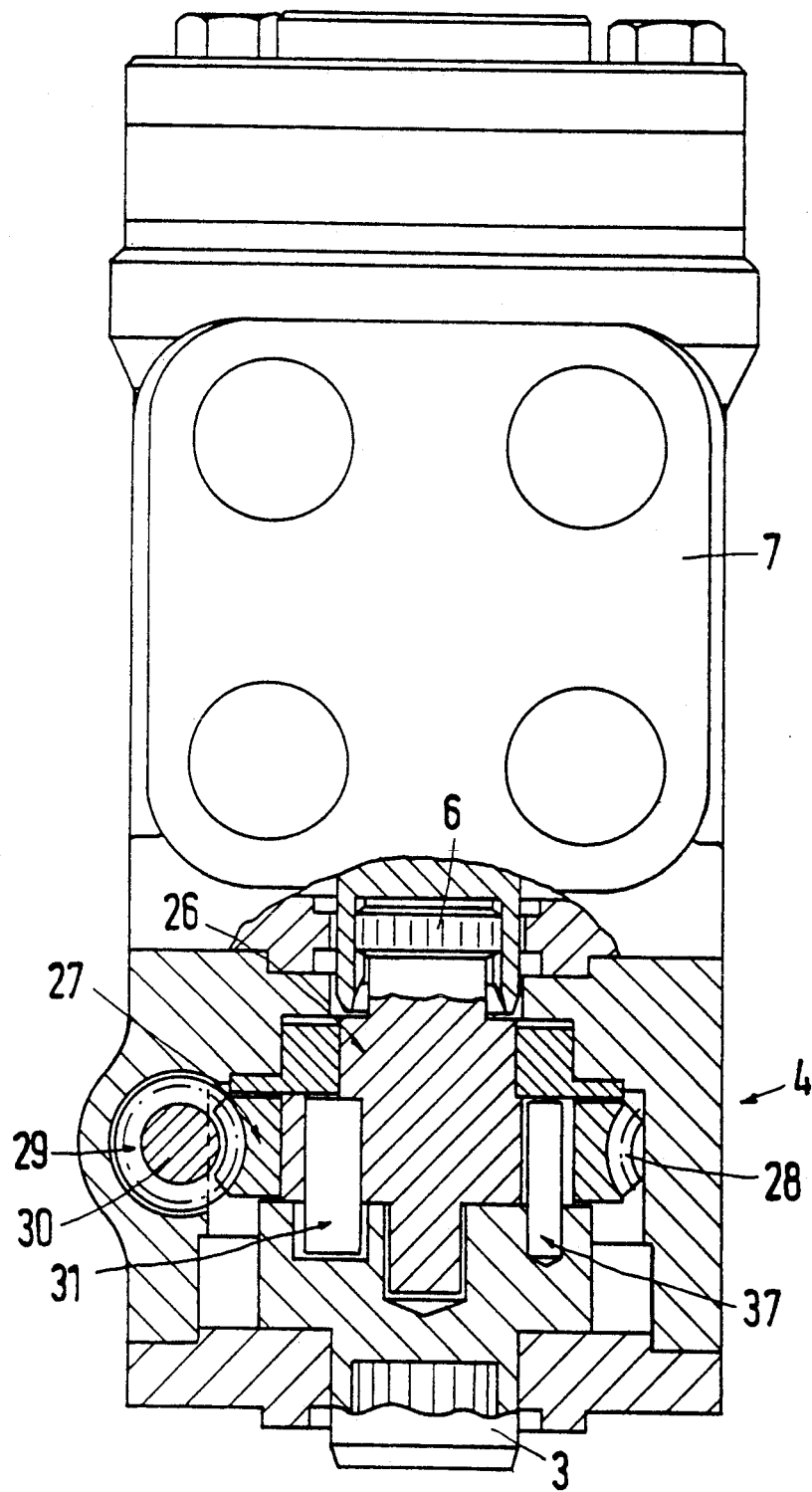
FIG. 4 shows a cross-section through the load torque isolating device.

FIG. 4 shows a cross-section through the load torque isolating device in the form of an overrunning clutch 4. If the motor 5 is now operated, the shaft 30 rotates and, because of the worm gear 29, 28, the housing 27 also rotates. Torque is transmitted to the steering shaft 6 by way of the jamming rollers 34. The steering shaft 6 rotates. The steering motor 10 is operated. At the same time, the steering handwheel shaft 3 is co-rotated by the driver pins 31. Even when the steering handwheel 2 is operated during this movement, the jamming coupling or friction coupling between the hub 26 and the housing 27 is released. The motor 5 is then able to continue rotating, but in relation to the steering it serves no further function. The steering can therefore be carried out unaffected by the motor 5. The driver is even able to steer in the opposite direction to the motor 5, without having to work against the power of the motor 5.

The form of construction illustrated can be used, for example, for remote control of the steering arrangement, for example with the aid of the control stick 25 or even with the aid of the remote sensor 20. The control stick can take the burden off the driver when he is required to do a large amount of steering. It is also possible to steer the vehicle by remote control from the platform of the vehicle or, for example, by means of radio, from outside the vehicle. Using the remote sensor it is also possible to sense a kerbstone edge or similar edge, the vehicle then following this kerbstone edge.

FIG. 5 shows a further form of construction in which, in addition to the load torque isolating device 104, a planetary gear 40 is provided. The planetary gear 40 has a sun wheel 41, three planetary wheels 42, a planetary wheel holder 43 and a gear wheel 44. A planetary gear in planar arrangement is illustrated, that is to say, the sun wheel, planetary wheels and gear wheel are all located in one plane. All other forms of a planetary gear are also possible, however. The gear wheel 44 has an external toothing 45, which meshes with the thread of the shaft 30. The gear wheel 44 also has an internal toothing 46, which meshes with the toothing 47 of the planetary wheels 42. The toothing 47 of the planetary wheels 42 in its turn meshes with a toothing 48 of the sun wheel 41.

The planetary wheel holder 43 is directly connected to the hub 26 of the load torque isolating device. The driver pins 31 are connected to the steering handwheel shaft 3. The hub 26 is wedged against a fixedly arranged housing 49 by the jamming rollers 34. The wedging can be released with the aid of the operating pins 37, which are likewise fixed to the steering handwheel shaft.

Figure 6:
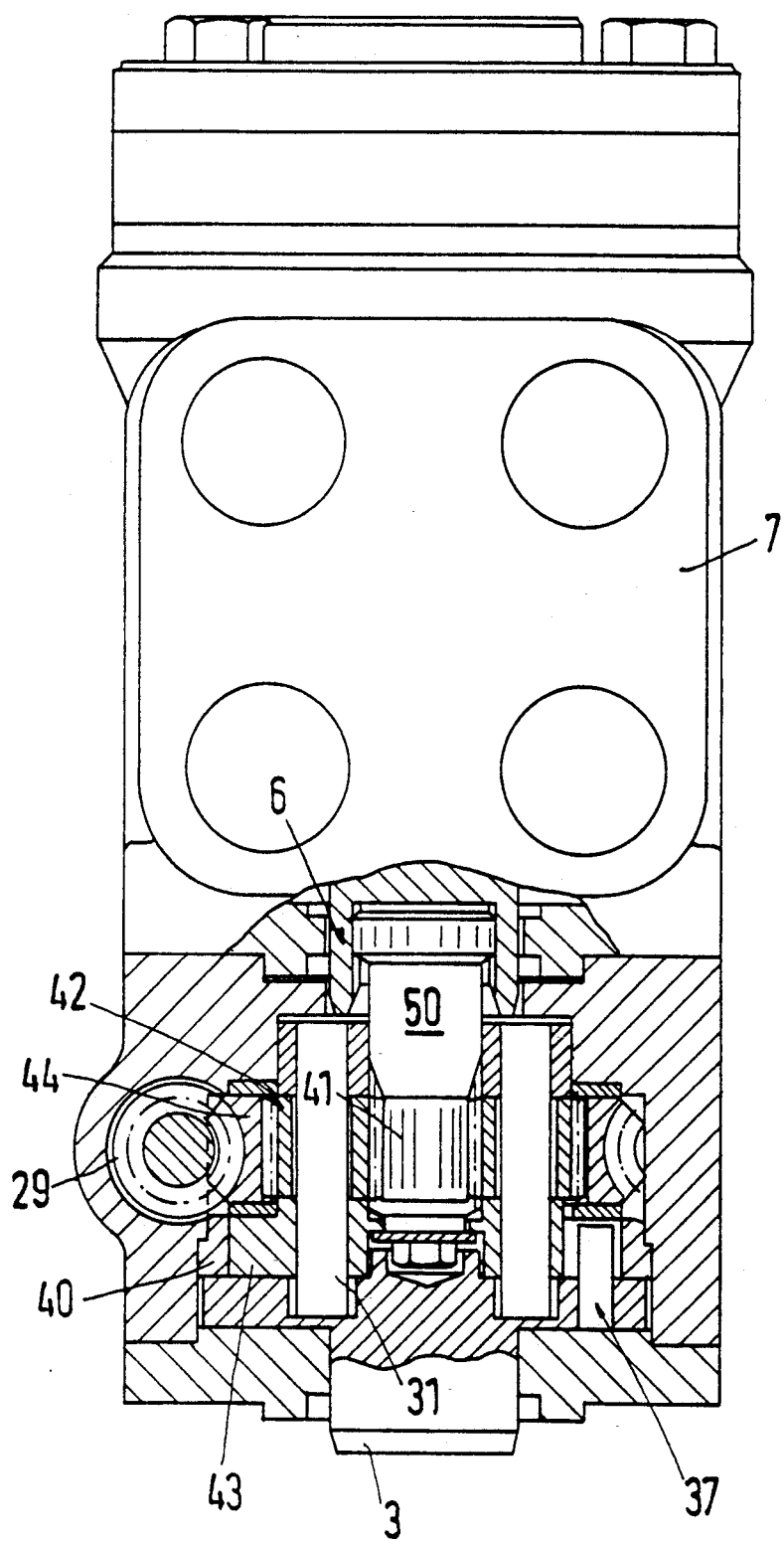
FIG. 6 shows a sectional view of the form of construction with a planetary gear.

When the steering handwheel shaft 2 is not being operated, the planetary wheel holding means 43 is held fixedly in the housing by the load torque isolating device 104, that is to say, the planetary wheel holding means 43 is unable to rotate. If the motor 5 is now operated, the gear wheel 44 is turned by the shaft 30. Because of the fixed planetary wheel holder 43, this rotation is stepped up, that is to say, geared to the sun wheel 41. The sun wheel 41 is connected to the steering shaft 6. A rotation of the sun wheel 41 thus effects a rotation of the steering shaft 6 and thus an operation of the steering control unit 7. If the steering handwheel 2 alone is operated, then the jamming roller 34 corresponding to the direction is released by its associated operating pin 37. The planetary wheel holding means 43 is now able to rotate freely in the housing 49. When the motor 5 is stationary, the gear wheel 44 is also still, since the worm gear formed by the shaft 30 and the gear wheel 44 is self-locking. Because the gear wheel 44 is firmly held, the movement of the steering handwheel shaft 3 is also stepped up, that is to say, is transferred with a higher gear ratio to the sun wheel 41. When the motor 5 and the steering handwheel 2 are operated simultaneously, the two movements are added by the planetary gear 40 and the sum of the movements is supplied to the steering shaft 6. FIG. 6 shows that the sun wheel is connected to the steering shaft 6 with the aid of an inserted coupling, that is to say, an internal toothing in the steering shaft 6 and an external toothing on a shaft 50 connected to the sun wheel 41.

The sun wheel 41 or the gear wheel 44 can, of course, be fixedly held by the load torque isolating device 104. In that case, the gear ratios are different.

Figure 7:
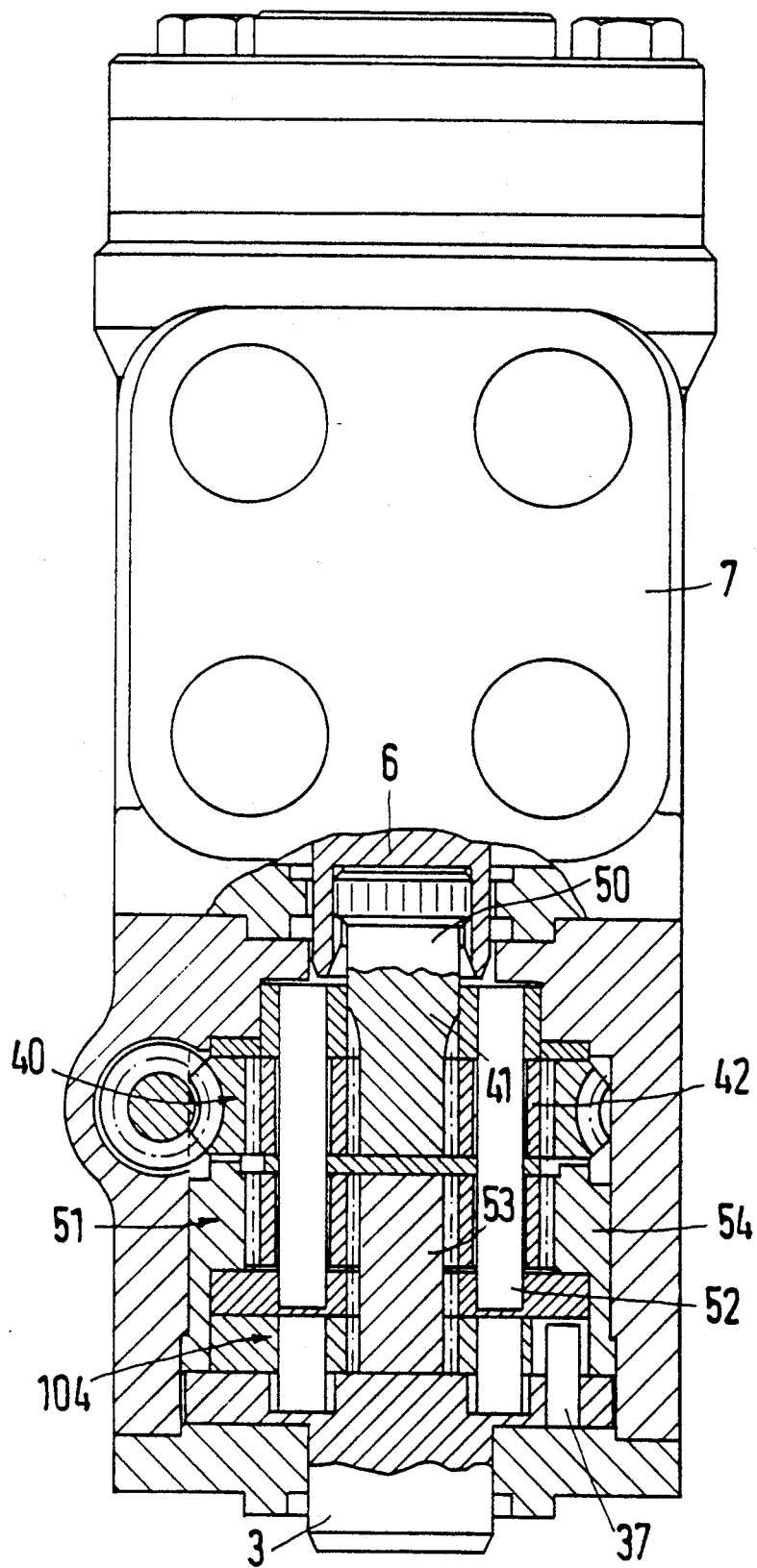
FIG. 7 shows a form of construction with two planetary gears.

FIG. 7 shows a further form of construction corresponding to that of FIG. 6, in which two planetary gears 40 and 51 are connected in series. Both planetary gears 40, 51 have a common planetary wheel holder 52. The sun wheel of the second planetary wheel gear 51 is connected by way of the load torque isolating device 104 to the steering handwheel shaft 3. The gear wheel 54 of the second planetary gear 51 is fixed in the housing. Provided that the steering handwheel 2 and thus the steering handwheel shaft 3 are not being operated, the planetary wheel holder 52 lies fixedly in the housing. A movement of the motor 5 is thus transferred to the sun wheel 41 of the first planetary gear 40. If, however, by operation of the steering handwheel 2 the load torque isolating device 104 is released, the movement of the steering handwheel shaft 3 is transferred by the sun wheel 53 of the second planetary gear and the common planetary wheel holder 52 to the sun wheel 41 of the first planetary gear 40. When the two planetary gears 40, 51 each have the same gear ratio, the movement of the steering handwheel shaft 3 is transferred to the steering shaft in the ratio 1:1.

With the aid of the planetary gear or gears 40, 51, and the angle of rotation and steering angle sensors 13, 15, it is possible to steer the Vehicle With a greater precision than was previously the case in an hydraulic steering system. The error between the desired and the actual value, that is to say, between the angle of rotation determined at the steering handwheel shaft 3 and the steering angle established at the working rod 17 of the steering motor 10, can be minimized with the aid of a control means which uses the motor 5 as positioning device. This is achieved in that the motor 5 adds or subtracts its movement to or from the movement of the steering handwheel 23.

Figure 8:
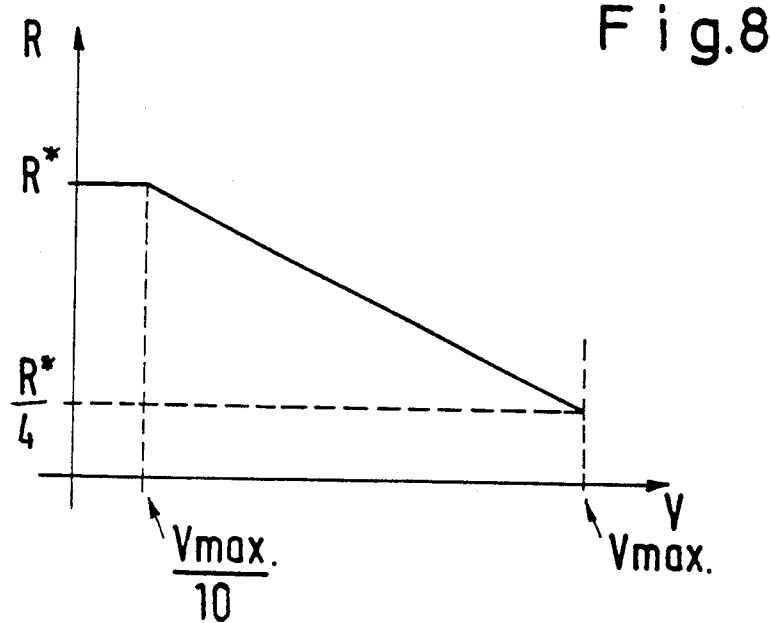
FIG. 8 shows a graph of the correlation between the vehicle speed and the gear ratio of the angle of rotation to the steering angle.

By measuring the driving speed with the aid of the vehicle speed sensor 22, it is possible to vary the gear ratio of the steering handwheel rotation to the wheel rotation, that is to say, the ratio of the angle of rotation to the steering angle as a function of the speed. This possibility is advantageous, for example, when the vehicle is to be maneuvered at low speed by small movements at the steering handwheel, but at greater speeds the same small movements at the steering handwheel are not to lead to instability of the vehicle. In order to achieve the different gear ratios of the angle of rotation to the steering angle, a sum that is dependent on the driving speed and the magnitude of the steering handwheel rotation is added to the steering handwheel rotation or subtracted therefrom. This is achieved in particular in that, as the vehicle speed increases, the steering locks of the wheels are reduced in relation to the steering wheel rotation. The correlation is shown by means a graph in FIG. 8. R is the ratio of the steering angle to the angle of rotation. R* represents the ratio that exists when the vehicle is stationary. At 10 percent of maximum speed, on the other hand, four times as many steering handwheel rotations are required in order to achieve the same change in steering angle. The curve runs preferably linearly in relation to the speed, that is to say, it falls away linearly.

Figure 9:
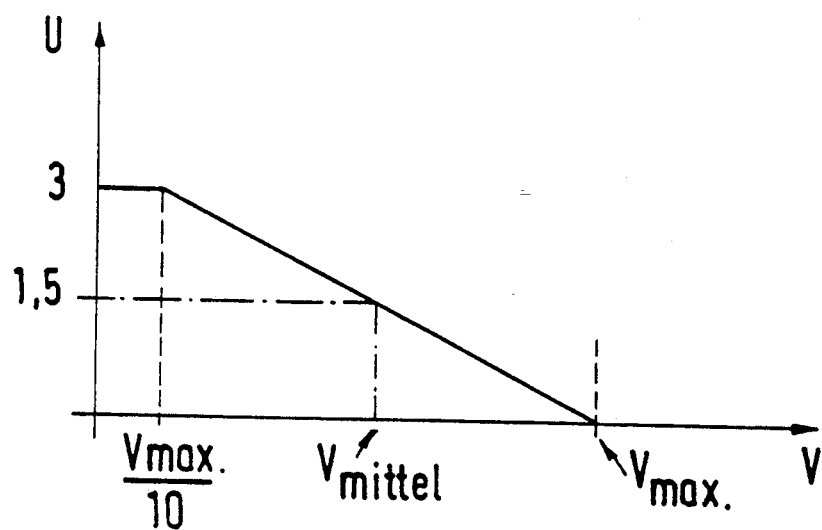
FIG. 9 shows a graph of the correlation between the vehicle speed and the ratio of motor rotation to steering handwheel rotation.

FIG. 9 shows the characteristic with which the motor 5 must work in dependence on the speed when the steering handwheel 2 is being operated. Here, v is the vehicle speed, while U is the ratio of the rotation of the motor 5 to the rotation of the steering handwheel 2. When the vehicle is stationary, or in the case of a vehicle which is being driven only at 10% of the maximum speed $v_{max}$, the motor assists the steering handwheel movement in the ratio of 1:3, that is to say, the steering handwheel 2 applies only one quarter of the necessary power to operate the steering control arrangement. At a moderate speed, the ratio is still 1:1.5, that is to say, 40% of the power now has to be applied by the steering handwheel 2. "Motor rotation" naturally means the rotation generated at the output of the worm gear.

Depending on the application, other numerical ratios can also be chosen.

We claim:

1. A vehicle steering arrangement comprising an operable motor having moveable output means, a steering shaft, a steering control unit that is operable by the steering shaft, a handwheel shaft, a handwheel rotatable by a manual force to rotate the handwheel shaft, steering control means for transmitting a rotating force from a selected one of said motor moveable output means and said handwheel shaft to said steering shaft, said steering control means including a load torque isolating device connected between the handwheel shaft and the steering shaft to rotate the steering shaft in either of two opposite directions of rotation without imposing any retarding load from the motor to the handwheel shaft when a manual force is applied for turning the handwheel shaft, said load torque isolating device including (1) a clutch housing rotatable by said motor and having a cylindrically shaped internal surface and (2) a hub member connected to and between said steering shaft and said handwheel shaft, said hub member having at least one transversely extending planar surface section forming with said housing cylindrically shaped internal surface a chamber having two wedge shaped sections, two jamming rollers respectively disposed in said wedge shaped sections with each said roller being alternately operable in one direction of rotation to a jamming condition to effect rotation of said hub member with said housing, and longitudinally extending pins fixed to said hub member and being respectively disposed in said wedge shaped sections n parallel with said rollers, each said pin being operable to effect the respective releasing of an adjacent said roller from said jamming condition by the rotation of said handwheel in the opposite direction by pushing said adjacent roller out of engagement with said clutch housing internal surface.

2. A steering arrangement according to claim 1, characterized in that the load torque isolating device comprises an overrunning clutch that is operable in two directions for transmitting a rotary force to the steering shaft and to the handwheel shaft when said operable motor is being operated and preventing movement of said operable motor when the handwheel shaft is being rotated by a manual force.

3. A steering arrangement according to claim 2, characterized in that the torque isolating device comprises a worm gear for drivingly connecting said operable motor to the overrunning clutch.

4. A steering arrangement according to claim 1 in combination with a vehicle and there is provided remote guide, characterized in that the steering control means includes a remote sensor for sensing the guide and control components connected to the sensor for controlling the operation of the motor.

5. A steering arrangement according to claim 4, characterized in that the steering control means includes a control arrangement remote from the vehicle.

6. A steering arrangement according o claim 1, characterized in that the steering control means includes an angle of rotation sensor arranged on the steering handwheel shaft, means for generating a steering signal and a control device for operating said operable motor to compensate for the difference between an output signal of the angle of rotation sensor and an output signal of the means for generating a steering signal.

7. A steering arrangement according to claim 6 in combination with a vehicle, the steering control unit having means for changing the direction of movement of the vehicle and a steering motor, the steering control means including a steering angle sensor on the steering motor, and the steering control means operates the operable motor to compensate for a difference between the output of the steering angle sensor on the steering motor and the signal of said means for generating a steering signal.

8. A steering arrangement according to claim 7, characterized in that the steering motor is a hydraulic motor and that the steering control unit comprises a hydraulic control device for operating the steering motor.

9. A steering arrangement according to claim 1, characterized in that the steering control unit includes a steering motor, and that there is provided a steering angle sensor on the steering motor, a second sensor for sensing the angle of rotation of the handwheel shaft, each of the sensors providing an output signal, and a control circuit which compares the output signal of the two sensors and on a predetermined difference between the two signals operates the operable motor as a positioning device.

10. A steering arrangement according to claim 9, characterized in that there is provided a vehicle driving speed sensor for producing an output signal and being connected to the control circuit, the control circuit changing the relationship of the angle of rotation and steering angle on the basis of the output signal from the driving sensor.

11. A steering arrangement according to claim 10, characterized in that the control circuit comprises means for decreasing the ratio of the angle of rotation to the steering angle with increasing vehicle speed.

12. A vehicle steering arrangement comprising an operable motor having moveable output means, a steering shaft, a steering control unit that is operable by the steering shaft, a handwheel shaft, a handwheel rotatable by a manual force to rotate the handwheel shaft, steering control means for transmitting a rotating force from a selected one of said motor moveable output means and said handwheel shaft to said steering shaft, said steering control means including a load torque isolating device connected between the handwheel shaft and the steering shaft to rotate the steering shaft in either of two opposite directions of rotation without imposing any retarding load from the motor to the handwheel shaft when a manual force is applied for turning the handwheel shaft.

said steering control means including a first planetary gear arranged between the steering wheel shaft and the load torque isolating device and the torque isolating device being arranged between the planetary gear and the handwheel shaft, the planetary gear including a sun wheel, a planetary wheel holder and a gear wheel, the sun wheel, the planetary wheel holder and the gear wheel each being connected to a different one of the handwheel shaft, the steering shaft and the operable motor.

13. A steering arrangement according to claim 12, characterized in that the planetary wheel holder is connected to the load torque isolating device, that the steering shaft is connected to the sun wheel, and that said operable motor is drivingly connected to the gear wheel.

14. A steering arrangement according to claim 13, characterized in that the load torque isolating device has a power take-off side and that the planetary wheel holder is directly connected to the power take-off side.

15. A steering arrangement according to claim 14, characterized in that the load torque isolating device includes a hub, and that the planetary wheels are secured to the hub.

16. A steering arrangement according to claim 12, characterized in that there is provided a second planetary gear between the load torque isolating device and the first planetary gear for driving the first planetary gear.

17. A steering arrangement according to claim 16, characterized in that said operable motor is drivingly connected to the gear wheel of the first planetary gear.

18. A steering arrangement according to claim 16, characterized in that the second planetary gear includes a non-rotatable gear wheel, a sun wheel connected to the steering wheel shaft and a planetary wheel holder connected to the planetary wheel holder of the first planetary gear and that the sun wheel of the first planetary gear is connected to the steering shaft.

19. A steering arrangement according to claim 18, characterized in that each of the first and second planetary gears has the same gear ration.

* * * * *